US011068421B1

(12) United States Patent
Tsai et al.

(10) Patent No.: US 11,068,421 B1
(45) Date of Patent: Jul. 20, 2021

(54) MEMORY DEVICE AND ASSOCIATED FLASH MEMORY CONTROLLER

(71) Applicant: Silicon Motion, Inc., Hsinchu County (TW)

(72) Inventors: Hung-Pin Tsai, New Taipei (TW); Chih-Chien Lin, New Taipei (TW); Chien-An Chen, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/796,839

(22) Filed: Feb. 20, 2020

(51) Int. Cl.
*G06F 13/40* (2006.01)
*G06F 13/42* (2006.01)
*G06F 13/16* (2006.01)
*G06F 1/24* (2006.01)
*G06F 13/28* (2006.01)

(52) U.S. Cl.
CPC .......... *G06F 13/1689* (2013.01); *G06F 1/24* (2013.01); *G06F 13/287* (2013.01); *G06F 13/4027* (2013.01); *G06F 13/4221* (2013.01)

(58) Field of Classification Search
CPC .............. G06F 13/1689; G06F 13/287; G06F 13/4027; G06F 13/4221; G06F 1/24
USPC ........................................................ 711/167
See application file for complete search history.

(56) References Cited

U.S. PATENT DOCUMENTS

| 10,884,914 | B2* | 1/2021 | Ahmed ................ G06F 3/0616 |
| 2009/0172260 | A1* | 7/2009 | Olbrich ............... G11C 7/1063 |
| | | | 711/103 |
| 2013/0297858 | A1* | 11/2013 | Schneier .............. G06F 3/0613 |
| | | | 711/103 |
| 2015/0169487 | A1* | 6/2015 | Subramaniyan ........ G06F 3/061 |
| | | | 710/5 |
| 2017/0046297 | A1* | 2/2017 | Chang ................. G06F 13/4027 |
| 2017/0357609 | A1* | 12/2017 | Long ..................... G06F 13/385 |
| 2018/0246833 | A1* | 8/2018 | Bai ........................ G06F 11/203 |
| 2020/0026683 | A1* | 1/2020 | Olarig ................. G06F 13/4022 |
| 2020/0050402 | A1* | 2/2020 | Furey .................... G06F 3/0688 |
| 2020/0065283 | A1* | 2/2020 | Jayaraman .......... G06F 13/4027 |
| 2020/0264893 | A1* | 8/2020 | Manjunatha .......... G06F 9/4401 |
| 2020/0301873 | A1* | 9/2020 | Borikar ................ G06F 13/404 |
| 2020/0402514 | A1* | 12/2020 | Yan ........................ G06F 3/167 |
| 2021/0042255 | A1* | 2/2021 | Colenbrander ....... G06F 3/0656 |

* cited by examiner

*Primary Examiner* — Christopher B Shin
(74) *Attorney, Agent, or Firm* — Winston Hsu

(57) ABSTRACT

The present invention provides a memory device including a connector and a flash memory controller. The connector is configured to connect to a first host and a second host. The flash memory controller is configured to select one of the first host and the second host based on a selection signal, and the flash memory controller only processes commands from the selected one of the first host and the second host, and accesses a flash memory module based on the commands.

9 Claims, 4 Drawing Sheets

MEMORY DEVICE AND ASSOCIATED FLASH MEMORY CONTROLLER

BACKGROUND OF THE INVENTION

1. Field of the Invention

The present invention relates to a memory device, and more particularly, to a failover mechanism of a memory device.

2. Description of the Prior Art

A solid-state drive (SSD) is a memory device that uses integrated circuit assemblies to store data, and the SSD becomes popular in the enterprise applications such as data center. In order to provide higher availability for the enterprise applications, the system generally has a failover mechanism that allows two hosts or two servers to access the SSD, that is if the primary server fails to access the SSD due to the operating system (OS) crash or hard disk broken issue, the standby server can immediately replace the primary server to avoid service interruption.

The conventional failover mechanism uses a dual-port SSD that allows two servers to concurrently access, however, the dual-port SSD has two flash memory controllers inside, and is very expensive. Therefore, in order to lower the manufacturing cost, a single-port SSD with a Peripheral Component Interconnect Express (PCIe) switch may be used to replace the functions of the dual-port SSD, however, the PCIe switch is also expensive, and a size of the PCIe switch is too large to fit inside the single-port SSD. Therefore, how to provide the failover mechanism using the single-port SSD is an important topic.

SUMMARY OF THE INVENTION

It is therefore an objective of the present invention to provide a failover mechanism for the single-port SSD, and the single-port SSD itself does not have PCIe switch for communicating with two hosts, to solve the above-mentioned problems.

According to one embodiment of the present invention, a memory device including a connector and a flash memory controller is provided. The connector is configured to connect to a first host and a second host. The flash memory controller is configured to select one of the first host and the second host based on a selection signal, and the flash memory controller only processes commands from the selected one of the first host and the second host, and accesses a flash memory module based on the commands.

According to another embodiment of the present invention, a flash memory controller is disclosed, wherein the flash memory controller is configured to access a flash memory module, and the flash memory controller comprises a memory for storing a program code, and a microprocessor for executing the program code to access the flash memory module via a control logic circuit. The flash memory controller is coupled to a first host and a second host, the microprocessor receives a selection signal indicating which one of the first host and the second host is selected, and the microprocessor only processes commands from the selected one of the first host and the second host, and accessing a flash memory module based on the commands.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
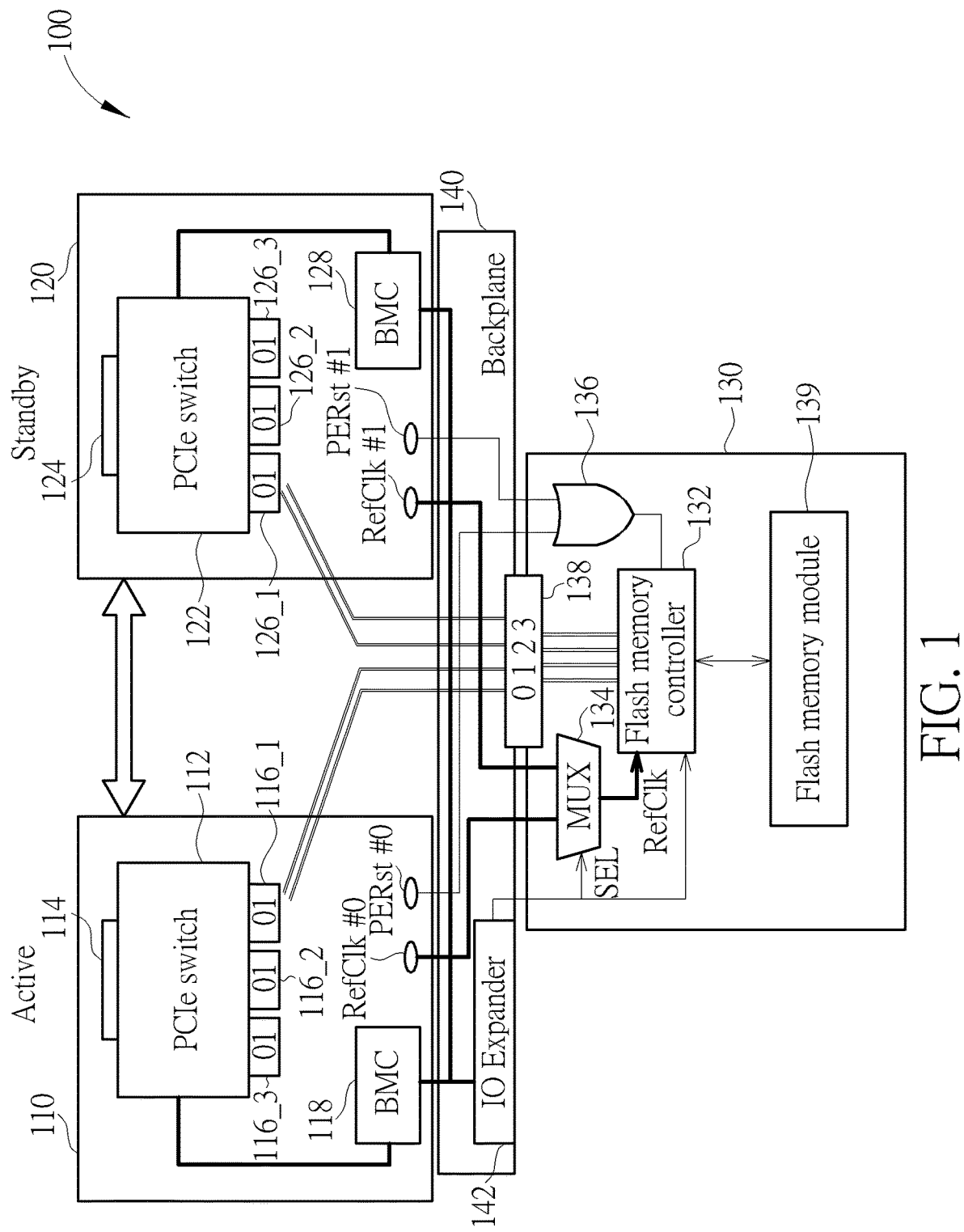
FIG. 1 is a diagram illustrating a system according to one embodiment of the present invention.

FIG. 1 is a diagram illustrating a system 100 according to one embodiment of the present invention. As shown in FIG. 1, the system 100 comprises two hosts 110 and 120, a memory device such as a SSD 130 and a backplane 140. The host 110 comprising at least a PCIe switch 112 and a baseboard management controller (BMC) 118, and the PCIe switch 112 comprises an upstream port 114 and a plurality of downstream ports (in this embodiment, the PCIe switch 112 comprises three downstream ports 116_1-116_3), wherein the upstream port 114 is used to connect a processing circuit such as a central processing unit (CPU) within the host 110, and each of the downstream ports 116_1-116_3 is used to connect to a device external to the host 110. The host 120 comprises at least a PCIe switch 122 and a BMC 128, and the PCIe switch 122 comprises an upstream port 124 and a plurality of downstream ports (in this embodiment, the PCIe switch 122 comprises three downstream ports 126_1-126_3), wherein the upstream port 124 is used to connect a processing circuit such as a CPU within the host 120, and each of the downstream ports 126_1-126_3 is used to connect to a device external to the host 120. The SSD 130 comprises a flash memory controller 132, a multiplexer 134, a logical circuit 136, a connector 138 and a flash memory module 139. The backplane 140 comprises an input/output (IO) expander. In this embodiment, the system 110 may be applied to a data center, that is the SSD 130 is configured to store and output data via local area network or Internet, and one of the hosts 110 and 120 is used to access the SSD 130 via the backplane.

In this embodiment, the connector 138 of the SSD 130 is a "8639 connector" or a "U.2 connector" comprising four lanes, and two of the lanes (e.g. lane #0 and lane #1) are coupled to the downstream port 116_1 of the host 110, and the other two lanes (e.g. lane #2 and lane #3) are coupled to the downstream port 126_1 of the host 120. The SSD 130 is a single-port SSD, that is the SSD 130 has only one flash memory controller 132, and only the flash memory controller 132 is allowed to receive the commands (e.g. read command or write command) from the host 110/120 to access the flash memory module 139. It is noted that flash memory controller 132 may be a single package mounted on a printed circuit board (PCB) within the SSD 130, and this single package comprises only one die for accessing the flash memory module 139. In other words, in the SSD 130 serving as the single-port SSD, the SSD 130 cannot be accessed by the hosts 110 and 120 simultaneously, that is the SSD 130 only receives commands from one host 110/120 at a time. In this embodiment, the flash memory controller 132 is configured to use only two of the four lanes to communicate with the host 110/120 at the same time, for example, the flash memory controller 132 is configured to use the signal/data of the lane #0 and the lane #1 of the connector 138.

In the operations of the system 100, suppose that the host 110 is active device that is accessing the SSD 130 and the host 120 is a standby device that is not able to access the SSD 130, the BMC 118 is configured to control the IO expander 142 to generate a selection signal SEL to the multiplexer 134 and the flash memory controller 132. At this time, the host 110 generates a reference clock signal RefClk #0 and a reset signal PERst #0, and the multiplexer 134 refers to the selection signal SEL to select the reference clock signal RefClk #0 as an output reference clock signal RefClk, and the flash memory controller 132 uses the output reference clock signal RefClk to execute the operations; and the flash memory controller 132 further receives the reset signal PERst #0 via the logical circuit 136 to reset the internal configuration. In addition, the flash memory controller 132 further receives the selection signal SEL from the multiplexer 134 to know that which one of the hosts 110 and 120 is active, for the flash memory controller 132 to have the appropriate configurations. It is noted that the host 120 (standby device) does not generate a reference clock signal RefClk #1 and a reset signal PERst #1. After the configuration of the flash memory controller 132 is reset, the CPU of the host 110 can send the commands to the flash memory controller 132 via the upstream port 114 and downstream port 116_1 of the PCIe switch 112 and the connector 138, and the flash memory controller 132 refers to the commands from the host 110 to access the flash memory module 139. At this time, because the flash memory controller 132 is configured to use only the lane #0 and the lane #1 to communicate with the host 110, the lane #2 and the lane #3 are disabled (that is the flash memory controller 132 does not process the signals corresponding to the lane #2 and the lane #3).

In the embodiment shown in FIG. 1, if the host 110 suddenly fails to access the SSD 130, for example, the operating system of the host 110 crashes, a hard-disk within the host 110 is broken, the downstream port 116_1 is disabled, or any other failure causes, the system 100 can immediately execute the failover mechanism, that is the host 120 replaces the host 110. Specifically, referring to FIG. 2, because the hosts 110 and 120 always communicate with each other, the host 120 can detect if the host 110 is able to access the SSD 130, for example, if the host 120 receives a special signal indicating a failover command from the host 110, and/or the host 120 does not receive a signal that is periodically sent from the host 110, and/or the host 120 sends a signal to the host 110 but does not receive a response, or any other failure detection mechanism, the host 120 can determine that the host 110 fails to access the SSD 130. Once the host 120 determines that the host 110 fails to access the SSD 130, the CPU of the host 120 notifies the BMC 128 to communicate with the BMC 118 to try to disable the downstream port 116_1 of the PCIe switch 112, and the CPU of the host 120 notifies the BMC 128 to control the IO expander 142 to generate the selection signal SEL, which indicates that the host 120 is selected, to the multiplexer 134 and the flash memory controller 132. At this time, the host 120 generates the reference clock signal RefClk #1 and the reset signal PERst #1, and the multiplexer 134 refers to the selection signal SEL to select the reference clock signal RefClk #1 as the output reference clock signal RefClk, and the flash memory controller 132 uses the output reference clock signal RefClk to executes the operations; and the flash memory controller 132 further receives the reset signal PERst #1 via the logical circuit 136 to reset the internal configuration. In addition, the flash memory controller 132 further receives the selection signal SEL from the multiplexer 134 to know that the host 120 becomes the active device and the host 110 becomes the standby device, for the flash memory controller 132 to have the appropriate configurations. It is noted that the host 110 (standby device) may not generate the reference clock signal RefClk #0 and the reset signal PERst #0. After the downstream port 116_1 of the PCIe switch 112 is disabled, the host 120 enables the downstream port 126_1 of the PCIe switch 122. It is noted that, because the flash memory controller 132 is configured to only use lane #0 and lane #1 of the connector 138, and the host 120 originally corresponds to the lane #2 and the lane #3 of the connector 138, the flash memory controller 132 may perform a lane reversal operation to communicate to the host 120 successfully. That is, the pins corresponding to the original lane #0 in the connector 138 are configured to be corresponding to the lane #3, the pins corresponding to the original lane #1 in the connector 138 are configured to be corresponding to the lane #2, the pins corresponding to the original lane #2 in the connector 138 are configured to be corresponding to the lane #1, and the pins corresponding to the original lane #3 in the connector 138 are configured to be corresponding to the lane #0. In addition, the lanes of the downstream port 126_1 of the PCIe switch 122 are configured to correspond the lanes of the connector 138, for example, the PCIe switch 122 may send training signals to the flash memory controller 132 to determine if the lanes are matched, if the lanes are not matched, the PCIe switch 122 may also execute the lane reversal operation to make that the pins corresponding to the original lane #0 in the downstream port 126_1 are configured to be corresponding to the lane #1, and the pins corresponding to the original lane #1 in the downstream port 126_1 are configured to be corresponding to the lane #0. After the configuration of the flash memory controller 132 and the PCIe switch 122 is reset, the CPU of the host 120 can send the commands to the flash memory controller 132 via the upstream port 124 and downstream port 126_1 of the PCIe switch 122 and the connector 138, and the flash memory controller 132 refers to the commands from the host 120 to access the flash memory module 139.

Figure 2:
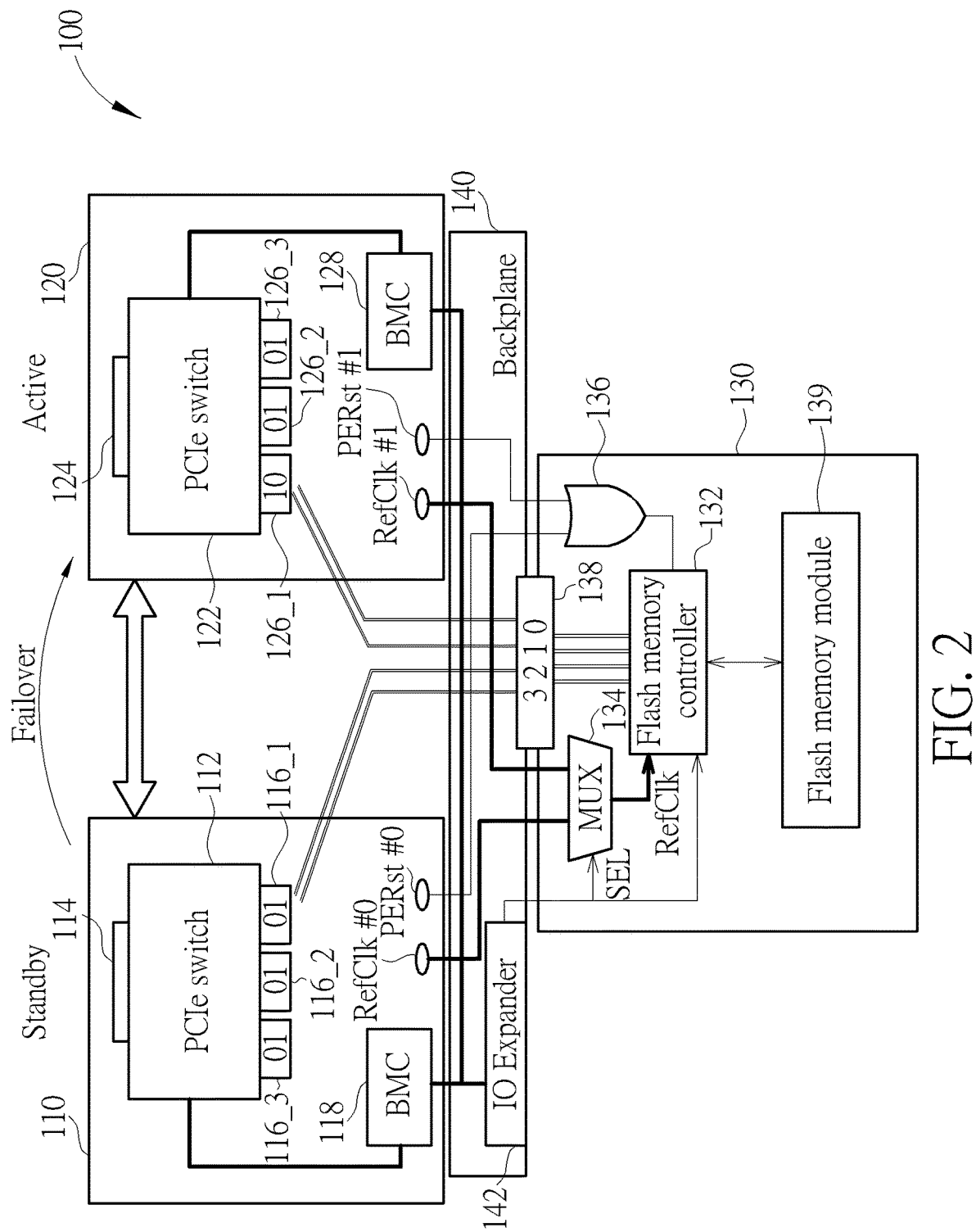
FIG. 2 shows a failover process of the system according to one embodiment of the present invention.

In addition, because the flash memory controller 132 is always configured to use only the lane #0 and the lane #1 to communicate with the host 110/120, the other lanes such as the lane #2 and the lane #3 should be controlled to be disabled to avoid incorrect operations of the SSD 130. In one embodiment, the lane #2 and the lane #3 may be disabled by the host 110/120. In another embodiment, the lane #2 and the lane #3 may be disabled by the flash memory controller 132, for example, if the flash memory controller 132 receives the selection signal SEL indicating that the host 110 is active, and the lanes are configured as shown in FIG. 1, the flash memory controller 132 directly enables the lane #0 and the lane #1 and disables the lane #2 and the lane #3; and if the flash memory controller 132 receives the selection signal SEL indicating that the host 120 is active and the lanes are originally configured as shown in FIG. 1, the flash memory controller 132 firstly performs the lane reversal operation to configure the lanes as shown in FIG. 2, and then enables the lane #0 and the lane #1 and disables the lane #2 and the lane #3 after the lane reversal operation is done.

In light of above, by adding the multiplexer 134 and designing the flash memory controller 132 to have the above-mentioned failover mechanism, system 100 can simply use the SSD 130 (single-port SSD) to achieve the high availability purposes, and the SSD 130 does not have any PCIe switch inside. Therefore, the SSD 130 within the system 100 of the embodiment has higher availability and lower manufacturing cost.

Figure 3:
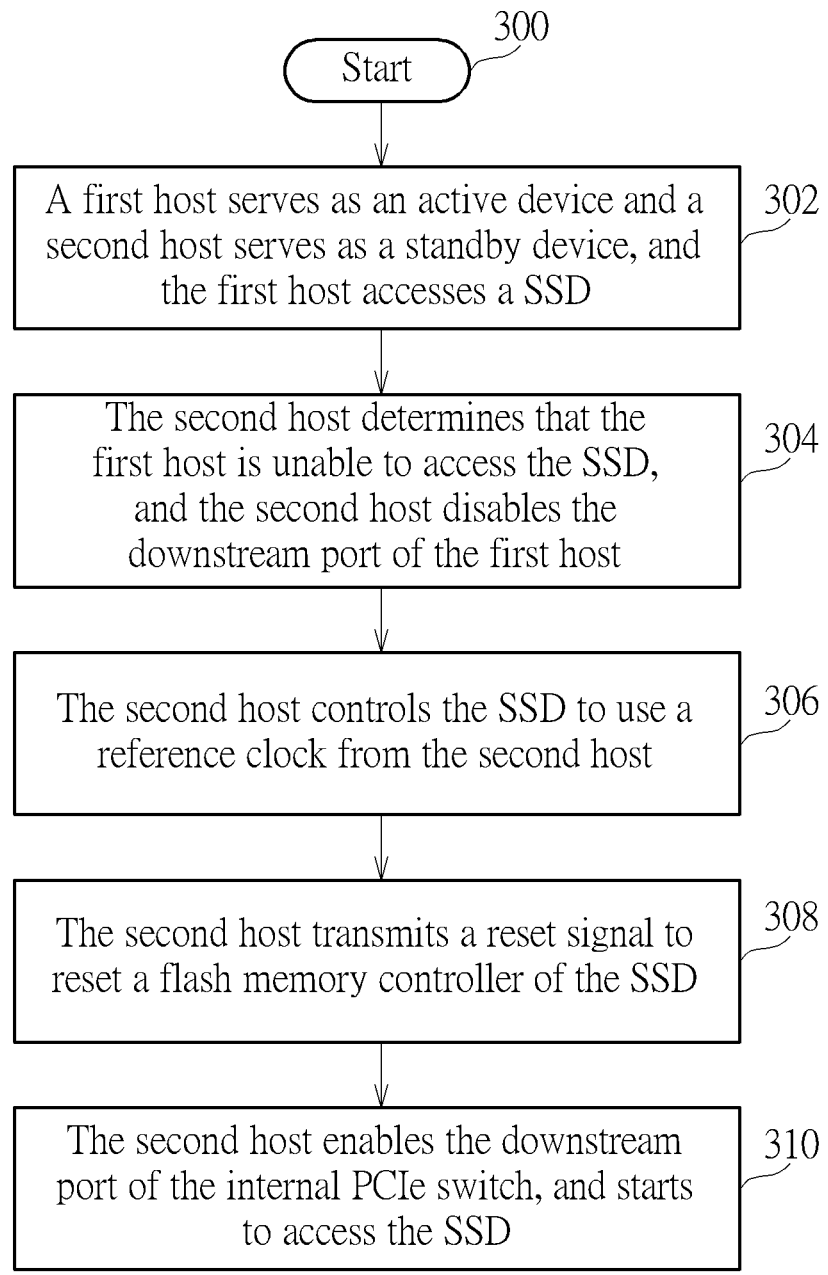
FIG. 3 is a flowchart of a failover process of the system according to one embodiment of the present invention.

FIG. 3 is a flowchart of a failover process of the system 100 according to one embodiment of the present invention. Referring to the above-mentioned embodiments, the flow is described as follows.

Step 300: the flow starts.

Step 302: a first host serves as an active device and a second host serves as a standby device, and the first host accesses a SSD.

Step 304: the second host determines that the first host is unable to access the SSD, and the second host disables the downstream port of the first host.

Step 306: the second host controls the SSD to use a reference clock from the second host.

Step 308: the second host transmits a reset signal to reset a flash memory controller of the SSD.

Step 310: the second host enables the downstream port of the PCIe switch, and starts to access the SSD.

Figure 4:
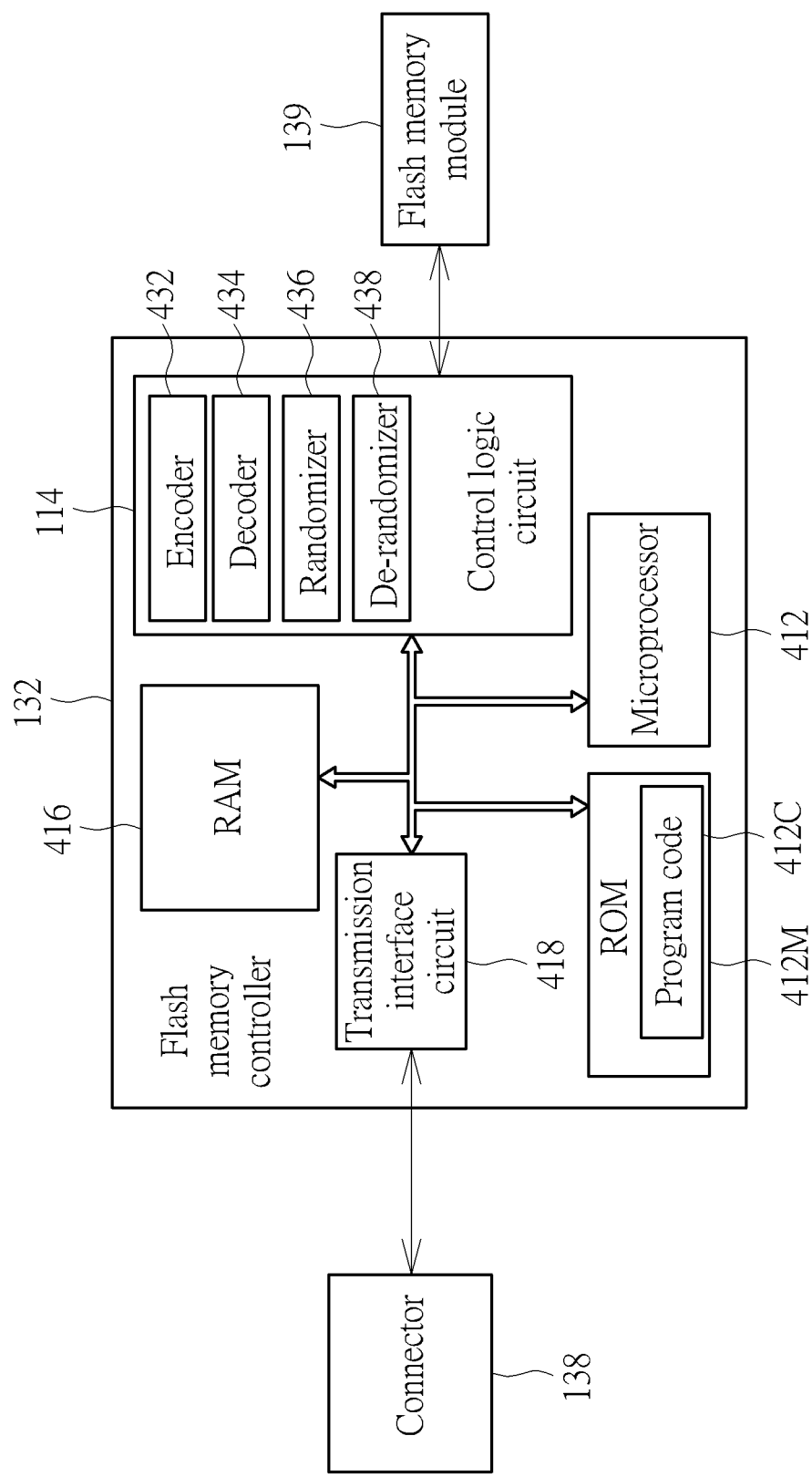
FIG. 4 is a diagram illustrating a flash memory controller according to one embodiment of the present invention.

FIG. 4 is a diagram illustrating the flash memory controller 132 according to one embodiment of the present invention. As shown in FIG. 1, the flash memory controller 132 may comprise a processing circuit such as a microprocessor 412, a storage unit such as a read-only memory (ROM) 412M, a control logic circuit 414, a random-access memory (RAM) 416, and a transmission interface circuit 418, where the above components may be coupled to one another via a bus. The RAM 416 is implemented by a Static RAM (SRAM), but the present invention is not limited thereto. The RAM 416 may be arranged to provide the flash memory controller 132 with internal storage space. For example, the RAM 416 may be utilized as a buffer memory for buffering data. In addition, the ROM 412M of this embodiment is arranged to store a program code 412C, and the microprocessor 412 is arranged to execute the program code 412C to control the access of the flash memory 139. Note that, in some examples, the program code 412C may be stored in the RAM 416 or any type of memory. Further, the control logic circuit 414 may be arranged to control the flash memory module 139, and may comprise an encoder 432, a decoder 434, a randomizer 436, a de-randomizer 438 and other circuits. The transmission interface circuit 418 may conform to a specific communications specification (e.g. Serial Advanced Technology Attachment (Serial ATA, or SATA) specification, Peripheral Component Interconnect (PCI) specification, PCIe specification, UFS specification, etc.), and may perform communications according to the specific communications specification, for example, perform communications with the host 110/120 via the connector 138.

In this embodiment, because the SSD 130 comprises only one flash memory controller 132 comprising the elements as shown in FIG. 4, all of the commands or data communicated between the host 110/120 and the flash memory module 139 must be processed via the elements controlled by the microprocessor 142 shown in FIG. 4, and all of the regions of the flash memory module 139 are configured to be accessed by the single flash memory controller 132.

Briefly summarized, in the system of the present invention, by providing the multiplexer within the SSD and designing the flash memory controller to have the above-mentioned failover mechanism, the system can simply use the single-port SSD to achieve the high availability purposes, and the SSD does not have any PCIe switch inside. Therefore, the SSD within the system 100 has higher availability and lower manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory device, comprising:
   a connector, configured to connect to a first host and a second host;
   a flash memory controller, for selecting one of the first host and the second host based on a selection signal, and only processing commands from the selected one of the first host and the second host, and accessing a flash memory module based on the commands;
   wherein the memory device is a single-port solid-state drive (SSD), and the first host and the second host are not allowed to access the flash memory module via the flash memory controller at a same time;
   wherein initially the first host communicates with the flash memory controller, and when the flash memory controller receives the selection signal indicating that the second host is selected, the flash memory controller receives a reference clock signal and a reset signal from the second host, and the flash memory controller is configured to process the commands from the second host, and stop processing the commands from the first host.

2. The memory device of claim 1, further comprising:
   a multiplexer, for selecting one of a first reference clock signal and a second reference clock signal as the reference clock signal according to the selection signal, wherein the first reference clock signal corresponds to the first host, and the second reference clock signal corresponds to the second host;
   wherein the when the flash memory controller receives the selection signal indicating that the second host is selected, the multiplexer selects the second reference clock signal as the reference clock signal, and outputs the reference clock signal to the flash memory controller.

3. The memory device of claim 1, wherein the connector is configured to have a plurality of lanes, a first portion of the lanes correspond to the first host, a second portion of the lanes correspond to the second host; and if the first host is selected, the first portion of the lanes are enabled, and the second portion of the lanes are disabled; and if the second host is selected, the second portion of the lanes are enabled, and the first portion of the lanes are disabled.

4. The memory device of claim 3, wherein initially the first host communicates with the flash memory controller, and when the flash memory controller receives the selection signal indicating that the second host is selected, the flash memory controller executes a lane reversal operation to reverse lane numbers of the lanes, and second portion of the lanes are enabled, and the first portion of the lanes are disabled.

5. The memory device of claim 4, wherein when the flash memory controller receives the selection signal indicating that the second host is selected, the flash memory controller executes the lane reversal operation to reverse the lane numbers of the lanes, and the flash memory controller enables the second portion of the lanes, and disables the first portion of the lanes.

6. A flash memory controller, wherein the flash memory controller is configured to access a flash memory module, the flash memory controller is built in a single-port solid-state drive (SSD), and the flash memory controller comprising:
  a memory, for storing a program code; and
  a microprocessor, for executing the program code to access the flash memory module via a control logic circuit;
  wherein the flash memory controller is coupled to a first host and a second host, the microprocessor receives a selection signal indicating which one of the first host and the second host is selected, and the microprocessor only processes commands from the selected one of the first host and the second host, and accessing a flash memory module based on the commands; and the microcontroller is not allowed to process the commands from the first host and the second host at a same time;
  wherein initially the flash memory controller communicates with the first host, and when the microprocessor receives the selection signal indicating that the second host is selected, the microprocessor receives a reference clock signal and a reset signal from the second host, and the microprocessor configures the flash memory controller to process the commands from the second host, and stop processing the commands from the first host.

7. The flash memory controller of claim 6, wherein a connector coupled to the flash memory controller is configured to have a plurality of lanes, a first portion of the lanes correspond to the first host, a second portion of the lanes correspond to the second host; and if the first host is selected, the first portion of the lanes are enabled, and the second portion of the lanes are disabled; and if the second host is selected, the second portion of the lanes are enabled, and the first portion of the lanes are disabled.

8. The flash memory controller of claim 7, wherein initially the flash memory controller communicates with the first host, and when the microprocessor receives the selection signal indicating that the second host is selected, the microprocessor executes a lane reversal operation to reverse lane numbers of the lanes, and second portion of the lanes are enabled, and the first portion of the lanes are disabled.

9. The flash memory controller of claim 8, wherein when the microprocessor receives the selection signal indicating that the second host is selected, the microprocessor executes the lane reversal operation to reverse the lane numbers of the lanes, and the microprocessor enables the second portion of the lanes, and disables the first portion of the lanes.

\* \* \* \* \*